(12) United States Patent
Xu et al.

(10) Patent No.: US 11,895,619 B2
(45) Date of Patent: Feb. 6, 2024

(54) PAGE DECODING REDUCTION BASED ON DOWNLINK CONTROL INFORMATION INDICATION

(71) Applicant: QUALCOMM Incorporated, San Diego, CA (US)

(72) Inventors: Huilin Xu, Temecula, CA (US); Yuchul Kim, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 255 days.

(21) Appl. No.: 17/444,291

(22) Filed: Aug. 3, 2021

(65) Prior Publication Data

US 2022/0039062 A1    Feb. 3, 2022

Related U.S. Application Data

(60) Provisional application No. 63/060,431, filed on Aug. 3, 2020.

(51) Int. Cl.
*H04W 68/00* (2009.01)
*H04W 72/1263* (2023.01)
*H04W 72/23* (2023.01)

(52) U.S. Cl.
CPC ..... *H04W 68/005* (2013.01); *H04W 72/1263* (2013.01); *H04W 72/23* (2023.01)

(58) Field of Classification Search
CPC ............ H04W 68/005; H04W 68/025; H04W 72/1263; H04W 72/20; H04W 72/23
See application file for complete search history.

(56) References Cited

U.S. PATENT DOCUMENTS

| | | | |
|---|---|---|---|
| 2021/0127414 A1* | 4/2021 | Abdoli | H04L 1/1887 |
| 2021/0219263 A1* | 7/2021 | Gao | H04W 76/28 |
| 2022/0159669 A1* | 5/2022 | Kim | H04W 68/025 |
| 2022/0279479 A1* | 9/2022 | Nader | H04W 76/27 |

FOREIGN PATENT DOCUMENTS

WO    WO-2020063928 A1 *  4/2020 ............. H04W 4/08

* cited by examiner

*Primary Examiner* — Chi H Pham
*Assistant Examiner* — Vladislav Y Agureyev
(74) *Attorney, Agent, or Firm* — Harrity & Harrity, LLP

(57) ABSTRACT

Various aspects of the present disclosure generally relate to wireless communication. In some aspects, a user equipment (UE) may receive downlink control information that schedules a paging message, wherein the downlink control information indicates whether a UE group associated with the UE is paged in the paging message. The UE may determine whether to decode the paging message based at least in part on the downlink control information that indicates whether the UE group associated with the UE is paged in the paging message. Numerous other aspects are provided.

30 Claims, 6 Drawing Sheets

PAGE DECODING REDUCTION BASED ON DOWNLINK CONTROL INFORMATION INDICATION

CROSS-REFERENCE TO RELATED APPLICATION

This Patent Application claims priority to U.S. Provisional Patent Application No. 63/060,431, filed on Aug. 3, 2020, entitled "PAGE DECODING REDUCTION BASED ON DOWNLINK CONTROL INFORMATION INDICATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for page decoding reduction based on downlink control information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: receiving downlink control information that schedules a paging message, wherein the downlink control information indicates whether a UE group associated with the UE is paged in the paging message; and determining whether to decode the paging message based at least in part on the downlink control information that indicates whether the UE group associated with the UE is paged in the paging message.

In some aspects, a method of wireless communication performed by a base station includes: transmitting, to a UE, downlink control information that schedules a paging message, wherein the downlink control information indicates whether a UE group associated with the UE is paged in the paging message; and transmitting the paging message to the UE.

In some aspects, a UE for wireless communication includes: a memory; and one or more processors coupled to the memory, the one or more processors configured to: receive downlink control information that schedules a paging message, wherein the downlink control information indicates whether a UE group associated with the UE is paged in the paging message; and determine whether to decode the paging message based at least in part on the downlink control information that indicates whether the UE group associated with the UE is paged in the paging message.

In some aspects, a base station for wireless communication includes: a memory and one or more processors coupled to the memory, the one or more processors configured to: transmit, to a UE, downlink control information that schedules a paging message, wherein the downlink control information indicates whether a UE group associated with the UE is paged in the paging message; and transmit the paging message to the UE.

In some aspects, a non-transitory computer-readable medium storing a set of instructions for wireless communication includes: one or more instructions that, when executed by one or more processors of a UE, cause the UE to: receive downlink control information that schedules a paging message, wherein the downlink control information indicates whether a UE group associated with the UE is paged in the paging message; and determine whether to decode the paging message based at least in part on the downlink control information that indicates whether the UE group associated with the UE is paged in the paging message.

In some aspects, a non-transitory computer-readable medium storing a set of instructions for wireless communication includes: one or more instructions that, when executed by one or more processors of a base station, cause the base station to: transmit, to a UE, downlink control information that schedules a paging message, wherein the downlink control information indicates whether a UE group associated with the UE is paged in the paging message; and transmit the paging message to the UE.

In some aspects, an apparatus for wireless communication includes: means for receiving downlink control information that schedules a paging message, wherein the downlink control information indicates whether a UE group associated with the apparatus is paged in the paging message; and means for determining whether to decode the paging message based at least in part on the downlink control information that indicates whether the UE group associated with the apparatus is paged in the paging message.

In some aspects, an apparatus for wireless communication includes: means for transmitting, to a UE, downlink control information that schedules a paging message, wherein the downlink control information indicates whether a UE group associated with the UE is paged in the paging message; and means for transmitting the paging message to the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
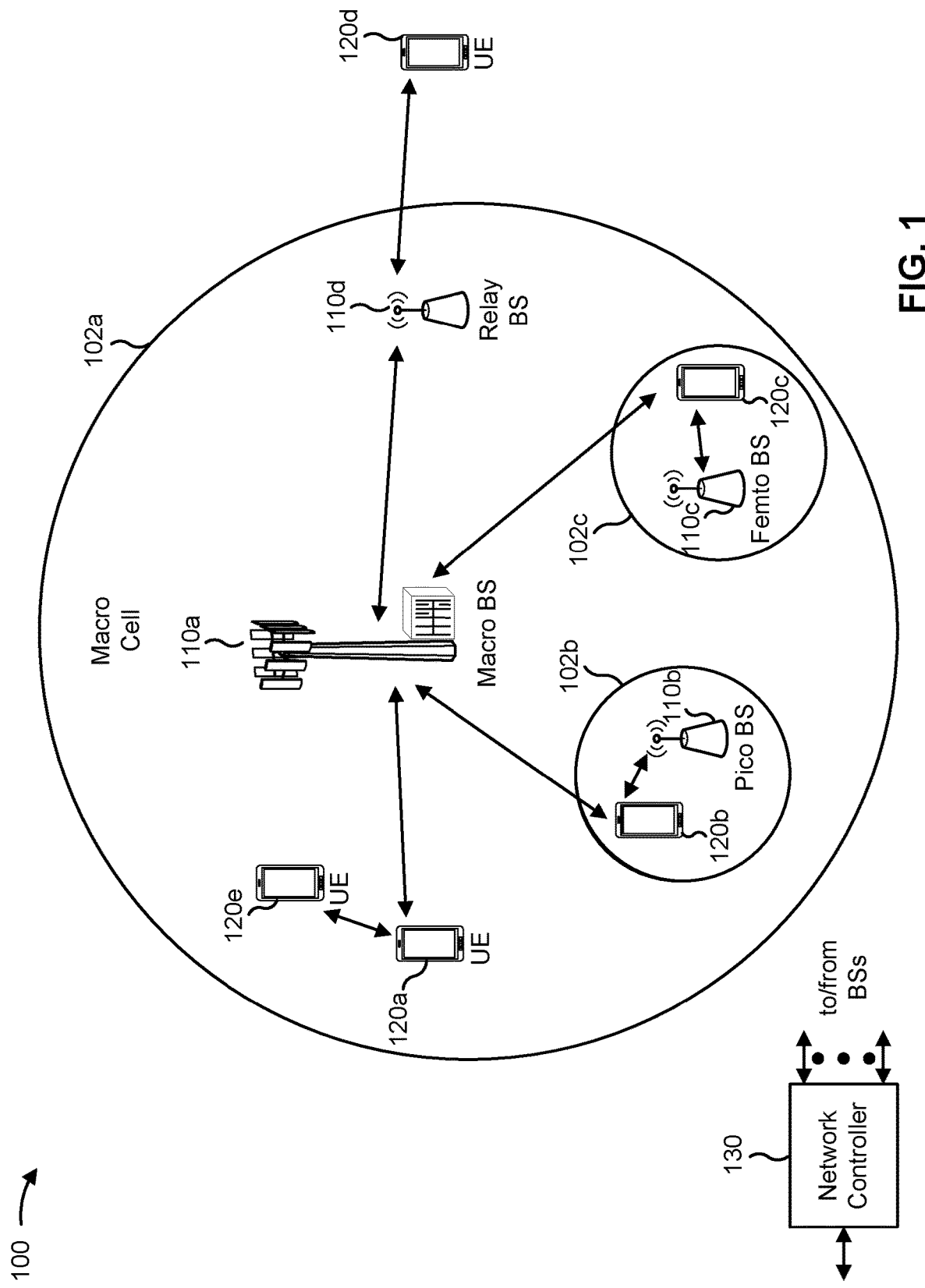
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
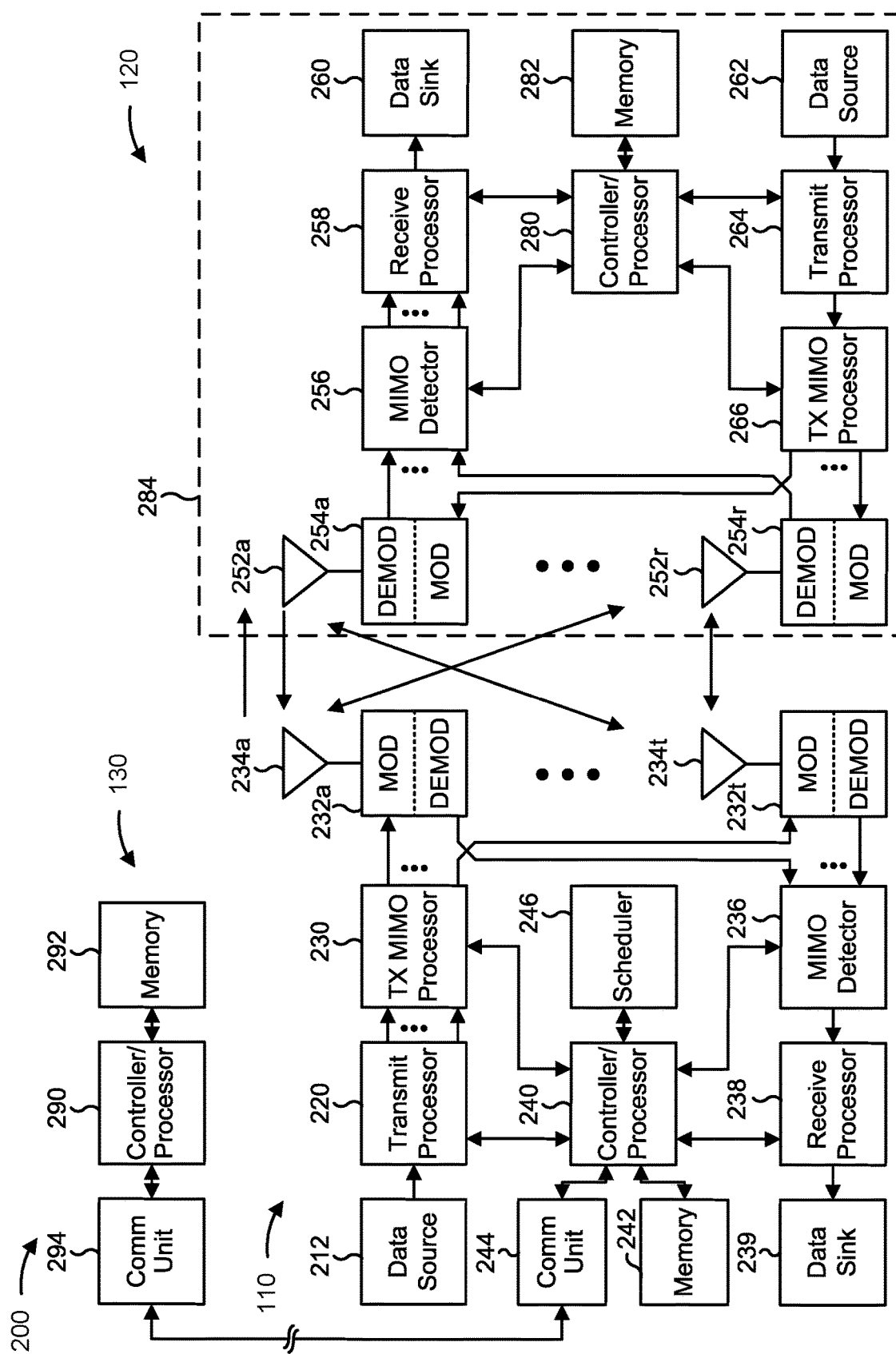
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-6).

Controller/processor 240 of base station 110, controller/processor 280 of UE 120, and/or any other component(s) of FIG. 2 may perform one or more techniques associated with page decoding reduction based on downlink control information, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, UE 120 may include means for receiving downlink control information that schedules a paging message, wherein the downlink control information indicates whether a UE group associated with the UE is paged in the paging message, means for determining whether to decode the paging message based at least in part on the downlink control information that indicates whether the UE group associated with the UE is paged in the paging message, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, base station 110 may include means for transmitting, to a UE, downlink control information that schedules a paging message, wherein the downlink control information indicates whether a UE group associated with the UE is paged in the paging message, means for transmitting the paging message to the UE, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
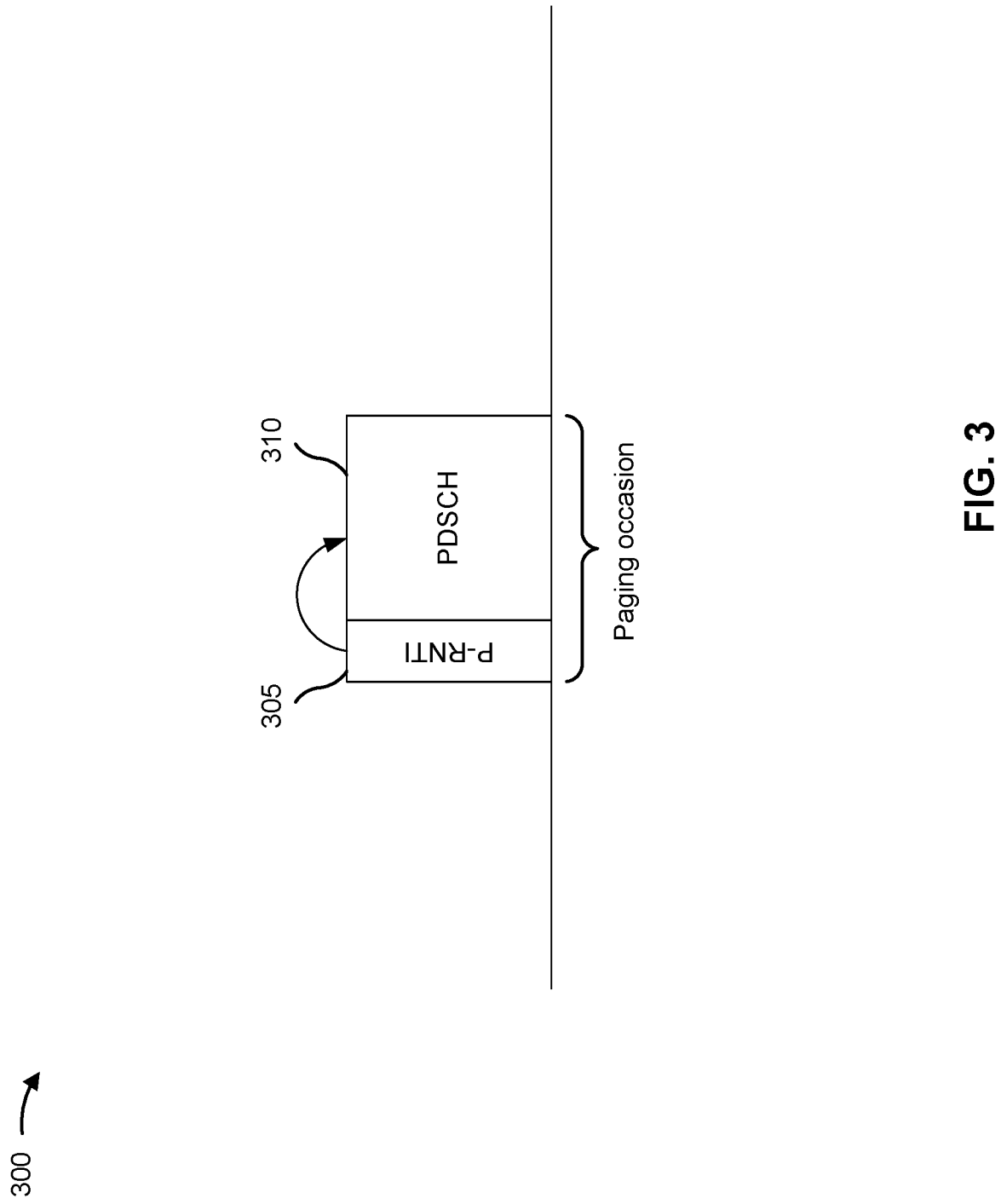
FIG. 3 is a diagram illustrating an example of a paging message, in accordance with the present disclosure.

FIG. 3 is a diagram illustrating an example 300 of a paging message, in accordance with the present disclosure. When a UE is in a radio resource control (RRC) idle or inactive mode, a base station may page the UE with paging messages in predefined paging occasions to inform the UE that there is an incoming connection request, a system information update, or a short message.

As shown in FIG. 3, downlink control information (DCI) 305 with a cyclic redundancy check (CRC) scrambled by a paging radio network temporary identifier (P-RNTI) may be used to schedule a paging message 310 in a paging occasion. The paging message 310 may be physical downlink shared channel (PDSCH) communication. The DCI 305 may be included in a physical downlink control channel (PDCCH) communication. The DCI 305 may be group common DCI transmitted to multiple UEs.

The UE may decode the DCI 305 in the paging occasion. If the decoded DCI 305 is a P-RNTI DCI (e.g., DCI with CRC scrambled by P-RNTI), the UE may further decode the scheduled PDSCH paging message 310 and search for a UE identifier (UE-ID) associated with the UE in the decoded paging message 310 to determine whether the UE is paged. Thus, as long as one UE is paged in the paging occasion, all of the UEs that receive the DCI 305 have to decode the corresponding PDSCH paging message 310. This may be referred to as "unnecessary paging reception," and may cause a UE to consume power and computing resources (e.g., processing resources, memory resources, communication resources, or the like) to decode paging messages that do not page the UE.

In some aspects, a base station may serve different UEs of different categories and/or different UEs that support different capabilities. For example, the base station may serve a first category of UEs that have a less advanced capability (e.g., a lower capability and/or a reduced capability) and a second category of UEs that have a more advanced capability (e.g., a higher capability). A UE of the first category may have a reduced feature set compared to UEs of the second category and may be referred to as a reduced capability (RedCap) UE, a low tier UE, and/or an NR-Lite UE, among other examples. A UE of the first category may be, for example, an MTC UE, an eMTC UE, and/or an IoT UE, as described above in connection with FIG. 1. A UE of the second category may have an advanced feature set compared to UEs of the second category, and may be referred to as a baseline UE, a high tier UE, an NR UE, and/or a premium UE, among other examples. In some aspects, a UE of the first category has capabilities that satisfy requirements of a first (earlier) wireless communication standard but not a second (later) wireless communication standard, while a UE of the second category has capabilities that satisfy requirements of the second (later) wireless communication standard (and also the first wireless communication standard, in some cases).

As described above, unnecessary paging reception may cause UEs to consume power and computing resources to decode paging messages (e.g., PDSCH) that do not page the UEs. For RedCap UEs, power consumption in the RRC idle/inactive mode due to unnecessary paging reception may be a considerable factory in battery life, particularly when paging is repetitively performed. Thus, unnecessary paging reception may increase consumption of power and computing resources (e.g., processing resources, memory resources, communication resources, or the like) and result in decreased battery life for UEs.

Some techniques and apparatuses described herein enable a UE to determine whether a UE group associated the UE is being paged in a paging message from information included in DCI that schedules the paging message. As a result, the UE can avoid decoding the paging message when no UE in the UE group associated with the UE is being paged. Thus, instances of unnecessary paging reception may be reduced for the UE, which may decrease consumption of power and computing resources (e.g., processing resources, memory resources, communication resources, or the like) due to unnecessary paging reception and increase the battery life of the UE.

As indicated above, FIG. 3 is provided as an example. Other examples may differ from what is described with respect to FIG. 3.

Figure 4:
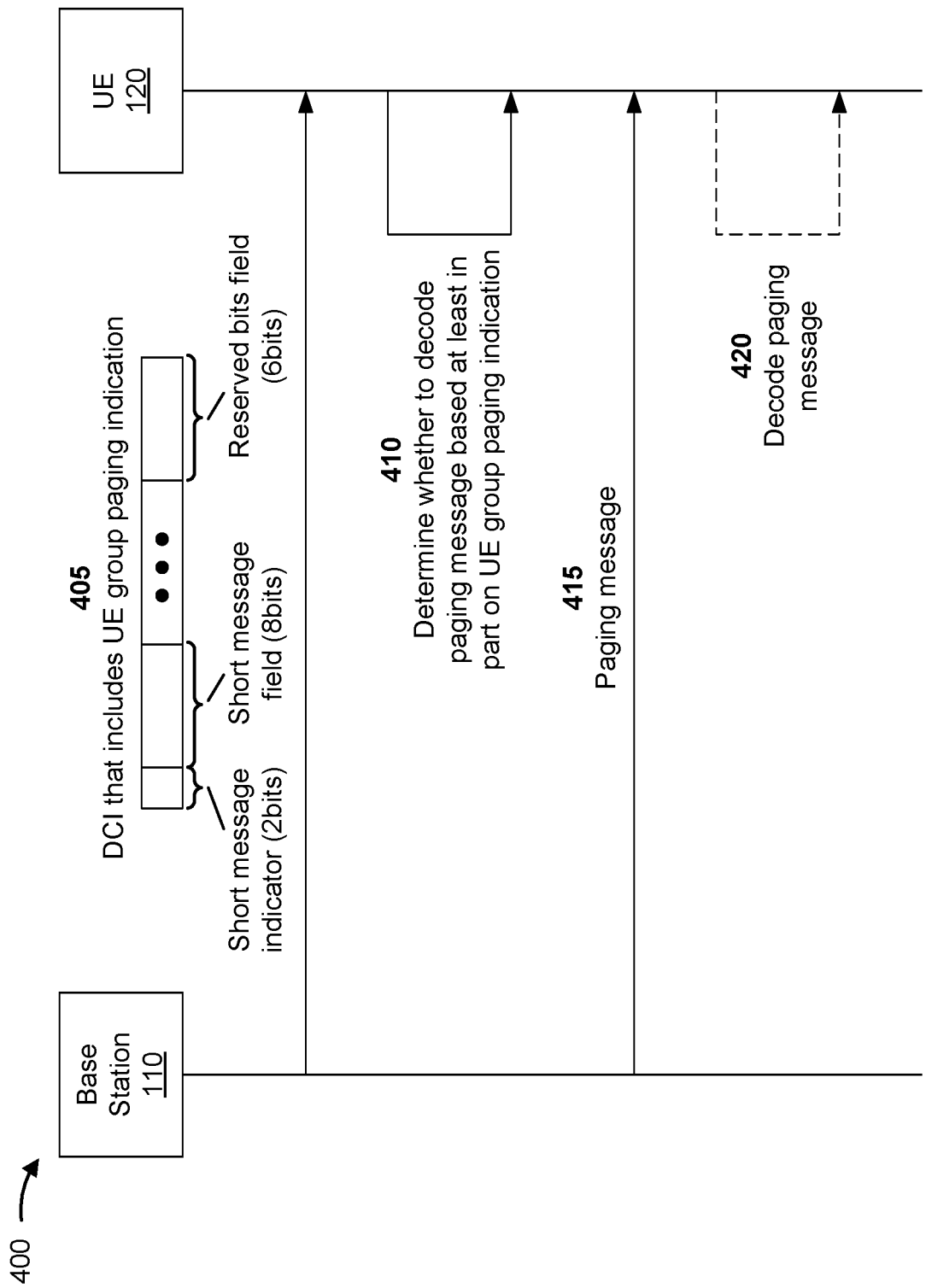
FIG. 4 is a diagram illustrating an example associated with page decoding reduction based on downlink control information, in accordance with the present disclosure.

FIG. 4 is a diagram illustrating an example 400 associated with page decoding reduction based on DCI, in accordance with the present disclosure. As shown in FIG. 4, example 400 includes communication between a BS 110 and a UE 120. In some aspects, BS 110 and UE 120 may be included in a wireless network, such as wireless network 100. BS 110 and UE 120 may communicate on a wireless access link, which may include an uplink and a downlink.

As shown in FIG. 4 and by reference number 405, the base station 110 may transmit, to the UE 120, DCI that includes a group paging indication. The DCI may be transmitted from the base station 110 to the UE 120 in a PDCCH communication. For example, the DCI may be included in a group common PDCCH communication transmitted to the UE 120 and one or more other UEs. The DCI may be paging DCI that schedules a paging message (e.g., a PDSCH paging message). The DCI may be transmitted in a pre-defined paging occasion to schedule the paging message for the paging occasion. The DCI may include a CRC scrambled by P-RNTI to indicate that the paging message is scheduled in the paging occasion.

The DCI may include a group paging indication that indicates whether a UE group associated with the UE 120 is paged in the paging message. The UE group associated with the UE 120 may include the UE 120 and one or more other UEs. As used herein, a UE group is paged when at least one UE in the UE group is paged in the paging message. Accordingly, the group paging indication included in the DCI may indicate that the UE group associated with the UE 120 is paged when the UE 120 and/or at least one of the other UEs in the UE group is paged in the paging message.

In some aspects, the DCI may use DCI format 1_0 with CRC scrambled by P-RNTI. As shown in FIG. 4, the DCI may include a short message indicator, a short message field, and a reserved bits field. The DCI may also include other fields associated with the DCI format (e.g., DCI format 1_0). In some aspects, the short message indicator may include two bits, the short message field may include eight bits, and the reserved bits field may include six bits. The value of the short message indicator may indicate whether the short message field is reserved. For example, short message indicator values of 00 and 01 may indicate that the short message field is reserved. In some aspects, the reserved bits field, the short message field, or a combination thereof may be used to provide paging indications for one or more UE groups.

The short message indicator may indicate which of the short message field and/or the reserved bits field provides the paging indications. In some aspects, when the short message indicator indicates that the short message field is reserved (e.g., the short message indication=00 or 01), one or more bits in the short message field may be used to provide the paging indications. In some aspects, when the short message indicator indicates that the short message field is reserved (e.g., the short message indication=00 or 01), only the short message field may be used to provide the paging indications. In some aspects, when the short message indicator indicates that the short message field is reserved (e.g., the short message indication=00 or 01), the short message field and the reserved bits field may be used to provide the paging indications. In some aspects, when the short message indicator indicates that the short message field is not reserved, the reserved bits field may be used to provide the paging indications.

In some aspects, no fields in the DCI may be used for the paging indications when the short message indicator indicates that the short message field is not reserved. In this case, only the reserved bits field, only the short message field, or both the reserved bits field and the short message field may be used to provide the paging indications when the short message indicator indicates that the short message field is reserved (e.g., the short message indication=00 or 01). In some aspects, no fields in the DCI may be used for the paging indications when the short message indicator indicates that the short message field is reserved (e.g., the short message indication=00 or 01). In this case, the reserved bit fields may be used to provide the paging indications when the short message indicator indicates that the short message field is not reserved.

In some aspects, a configuration (e.g., an RRC configuration or medium access control (MAC) control element (MAC-CE) command) transmitted to the UE 120 from the base station 110 prior to the DCI may specify which of the short message field and/or the reserved bits field is to be used to provide the paging indications when the short message field is reserved and/or when the short message field is not reserved. For example, the configuration may include a mapping between values of the short message indicator and which of the short message field and/or the reserved bits field is to be used to provide the paging indications. In some aspects, a predefined rule (e.g., in a wireless communication standard) may specify which of the short message field and/or the reserved bits field is to be used to provide the paging indications when the short message field is reserved and/or when the short message field is not reserved.

As described above one or more bits in the short message field and/or the reserved bits field may be used to provide paging indications for one or more UE groups. A coding rule may be defined to map values (e.g., 0 or 1) of bits in the short message field and/or the reserved bits field to one or more paging indications for one or more UE groups.

In some aspects, different bits in the short message field and/or the reserved bits field may be used to provide respective paging indications for different UE groups. In this case, a bit in the short message field and/or the reserved bit field may indicate whether a respective UE group is paged or not paged. For example, a value of 0 for the bit may indicate that the respective UE group is not paged and a value of 1 for the bit may indicate that the respective UE group is paged. In this case, paging indications may be simultaneously provided for multiple UE groups (e.g., the UE group associated with the UE 120 and one or more other UE groups). For example, if two bits are used to provided respective paging indications for a first UE group and a second UE group, 00 may indicate that no UE group is paged, 01 may indicate that the first UE group is paged, 10 may indicate that the second UE group is paged, and 11 may indicate that both the first UE group and the second UE group are paged.

In some aspects, a combination of values for one or more bits in the short message field and/or the reserved bits field may indicate a particular UE group that is paged. Different combinations of values for the bits in the short message field and/or the reserved bits field may be used to provide the paging indication for different UE groups. For example, with two bits, 00 may indicate that no UE group is paged, 01 may indicate that a first UE group is paged, 10 may indicate that a second UE group is paged, and 11 may indicate that a third UE group is paged.

In some aspects, different combinations of values for bits in the short message field and/or the reserved bits field may be used to indicate that different combinations of one or more UE groups are paged. A particular combination of values for the bits in the short message field and/or the reserved bits field may indicate one UE group that is paged or a set of multiple UE groups that are paged. A mapping rule may be used to map the different combinations of values for bits in the short message field and/or the reserved bits field to the different combinations of one or more UE groups. For example, with two bits, 00 may be mapped to an indication that no UE group is paged, 01 may be mapped to an indication that a first UE group and a second UE group are paged, 10 may be mapped to an indication that a third UE group is paged, and 11 may be mapped to an indication that the second UE group and a fourth UE group are paged. In some aspects, the mapping may be specified in a configuration (e.g., an RRC configuration) transmitted from the base station 110 to the UE 120 prior to the DCI.

In some aspects, the reserved bits field and the short message field may be used to provide indications for one or more UE groups and one or more UE subgroups of the one or more UE groups. The reserved bits field may be used to indicate whether a UE group (e.g., the UE 120 group associated with the UE 120) is paged. When the short message indicator indicates that the short message field is not reserved, only the reserved bits field may be used and no UE subgroup paging indications may be provided. When the short message indication indicates that the short message field is reserved (e.g., short message indicator=00 or 01), both the reserved bits field and the short message field may be used. In this case, when the reserved bits field indicates a paged UE group, the short message field may be used to indicate whether one or more UE subgroups within the paged UE group are paged. For example, the reserved bit field may indicate that the UE group associated with the UE 120 is paged, and the short message field may indicate whether a UE subgroup associated with the UE 120 (within the UE group associated with the UE 120) is paged.

In some aspects, a coding rule for the short message field may use values (e.g., 0 or 1) of the bits in the short message field to provide paging indications for one or more UE subgroups as described above in connection with the paging indications for the UE groups. In some aspects, different coding rules may be defined for the reserved bits field to provide paging indications for one or more UE groups and the short message field to provide paging indications for one or more UE subgroups. In some aspects, the short message field may be used to provide the paging indications for the one or more UE groups and the reserved message field may be used to provide the paging indications for the one or more UE subgroups.

The short message indicator may use a first value (e.g., 00) or a second value (e.g., 01) to indicate that the short message field is reserved. In some aspects, since both the first value (e.g., 00) and the second value (e.g., 01) indicate that the short message field is reserved, one of the first value (e.g., 00) or the second value (e.g., 01) of the short message indicator may also be used to indicate that a UE group is paged. In this case, the other one of the first value (e.g., 00) or the second value (e.g., 01) of the short message indicator may be used to indicate that that the short message field is reserved when no UE group is paged. In some aspects, both the first value (e.g., 00) and the second value (e.g., 01) of the short message indicator may be used to provide indications of whether a UE group is paged. One or more rules for when to use the first value (e.g., 00) and/or the second value (e.g., 01) of the short message indicator may be predefined (e.g., specified in a wireless communication standard) or may be configured by the base station 110 (e.g., in a configuration transmitted to the UE 120 prior to the DCI).

When the short message indicator indicates that the short message field is reserved, a selection of the first value (e.g., 00) or the second value (e.g., 01) for the short message indicator may provide additional information that can be used, together with the short message field and/or the reserved bits field, to provide the paging indications. For example, the first bit (e.g., 0) of the short message indicator may provide the indication that the short message field is reserved and the second bit (e.g., 0 or 1) of the short message field may provide an additional bit used, together with the bits of the with the short message field and/or the reserved bits field, to provide the paging indications.

In some aspects, the second bit of the short message indicator may be combined and jointly encoded with the bits in the short message field and/or the reserved bits field to provide the paging indications for one or more UE groups. For example, the second bit of the short message indicator may provide an indication of whether a particular UE group is paged. Additionally, and/or alternatively, a combination of values of the second bit of the short message indicator and one or more bits of the short message field and/or the reserved bits field may indicate that a particular UE group is paged or a particular set of one or more UE groups are paged.

In some aspects, the second bit of the short message indicator may be used to provide a paging indication at an additional level of grouping for the UEs. For example, the second bit of the short message indicator may provide a paging indication for a UE group at a highest level of grouping, and the bits of the short message field and/or the reserved bits field may provide paging indications for one or more UE subgroups of the UE group at a lower level of grouping. In some aspects, the second bit of the short message indicator may provide a paging indication that indicate that a particular UE group is paged. One of the short message field and/or the reserved bits field may provide paging indications for one or more first UE subgroups that are subgroups of the paged UE group. The other one of the short message field and/or the reserved bits field may provide paging indications for one or more second UE subgroups that are subgroups of at least one of the first UE subgroups. In some aspects, the second bit of the short message indicator may provide a paging indicator for a UE subgroup at a lower level of grouping than the lowest level of grouping for which paging indications are provided in the short message field and/or the reserved bits field.

In some aspects, the UE 120 (and one or more other UEs) may be mapped to the UE group associated with the UE 120 by a configuration received from the base station 110 prior to receiving the DCI. The UE group associated with the UE 120 may include the UE 120 and one or more other UEs that share the same paging occasion. The configuration may map a UE-ID of the UE 120 to a group ID of the UE group associated with the UE 120. The configuration may also map the UE 120 to one or more subgroups at one or more lower levels of grouping by mapping the UE-ID to one or more subgroup IDs.

In some aspects, the following mapping function may be used to map multiple UEs into a number of first level UE groups: Group ID=mod (UE-ID, number of first level groups). For example, if eight UEs are mapped to two first level UE groups, UE-IDs 0, 1, 2, 3, 4, 5, 6, and 7 may be mapped to first level group IDs 0, 1, 0, 1, 0, 1, 0, and 1, respectively. In some aspects, the UEs may be assigned UE-IDs within the first level groups to which the UEs are assigned, using the following function: UE-ID within the first level group=⌊UE-ID/number of first level groups⌋. For example, UE-IDs 0, 1, 2, 3, 4, 5, 6, and 7 may be assigned UE-IDs within the first level groups of 0, 0, 1, 1, 2, 2, 3, and 3, respectively. In some aspects, the UEs may be mapped to UE subgroups at one or more lower level of grouping, using the following mapping functions: Group/Subgroup ID of the nth level=mod (UE-ID in the n−1th level group, number of nth level groups within the n−1th level group), UE-ID within the nth level group=⌊UE-ID within the n−1th level group/ number of nth level groups within the n−1th level group⌋.

As further shown in FIG. 4, and by reference number 410, the UE 120 may determine whether to decode the paging message scheduled by the DCI based at least in part on the UE group paging indication included in the DCI. The UE 120 may determine whether to decode the paging message based at least in part on a paging indication, included in the DCI, that indicates whether the UE group associated with the UE 120 is paged. The UE 120 may determine to decode the paging message if the paging indication, included in the DCI, indicates that the UE group associated with the UE 120 is paged in the paging message. The UE 120 may determine not to decode the paging message if the paging indication, included in the DCI, indicates that the UE group associated with the UE 120 is not paged in the paging message.

In some aspects, the UE 120 may determine whether to decode the paging message based at least in part on a paging indication for the UE group associated with the UE 120 provided by a particular bit in the reserved bits field, the short message field, and/or the short message indicator. In some aspects, the UE 120 may determine whether to decode the paging message based at least in part on a combination of bits in the reserved bits field, the short message field, and/or the short message indicator that indicates a UE group that is paged or a combination of UE groups that are paged.

In some aspects, the UE 120 may whether to decode the paging message based at least in part on a first paging indication that indicates whether the UE group associated with the UE 120 is paged and/or a second paging indication that indicates whether a UE subgroup of the UE group associated with the UE 120 is paged.

As shown in FIG. 4, and by reference number 415, the base station 110 may transmit, to the UE 120, the paging message that is scheduled by the DCI. For example, the paging message may be a PDSCH paging message. The paging message may be transmitted from the base station 110 to the UE 120 in the same paging occasion as the DCI that schedules the paging message.

As shown in FIG. 4, and by reference number 420, if the UE 120 determines to decode the paging message based at least in part on the UE group paging indication included in the DCI, the UE 120 may decode the paging message. The paging message may page the UE 120 and/or one or more other UEs in the UE 120 group associated with the UE 120, for example, to inform the UE 120 and/or the one or more other UEs that there is an incoming connection request and/or system information update. The UE 120 may not decode the paging message if the UE 120 determines not to decode the paging message based at least in part on the UE group paging indication included in the DCI.

As described above in connection with FIG. 4, the UE 120 may determine whether the UE group associated the UE 120 is being paged in the paging message from information included in the DCI that schedules the paging message. As a result, the UE 120 can avoid decoding the paging message when no UE in the UE group associated with the UE 120 is being paged. Thus, instances of unnecessary paging reception may be reduced for the UE 120, which may decrease consumption of power and computing resources (e.g., processing resources, memory resources, communication resources, or the like) due to unnecessary paging reception and increase the battery life of the UE 120.

As indicated above, FIG. 4 is provided as an example. Other examples may differ from what is described with respect to FIG. 4.

Figure 5:
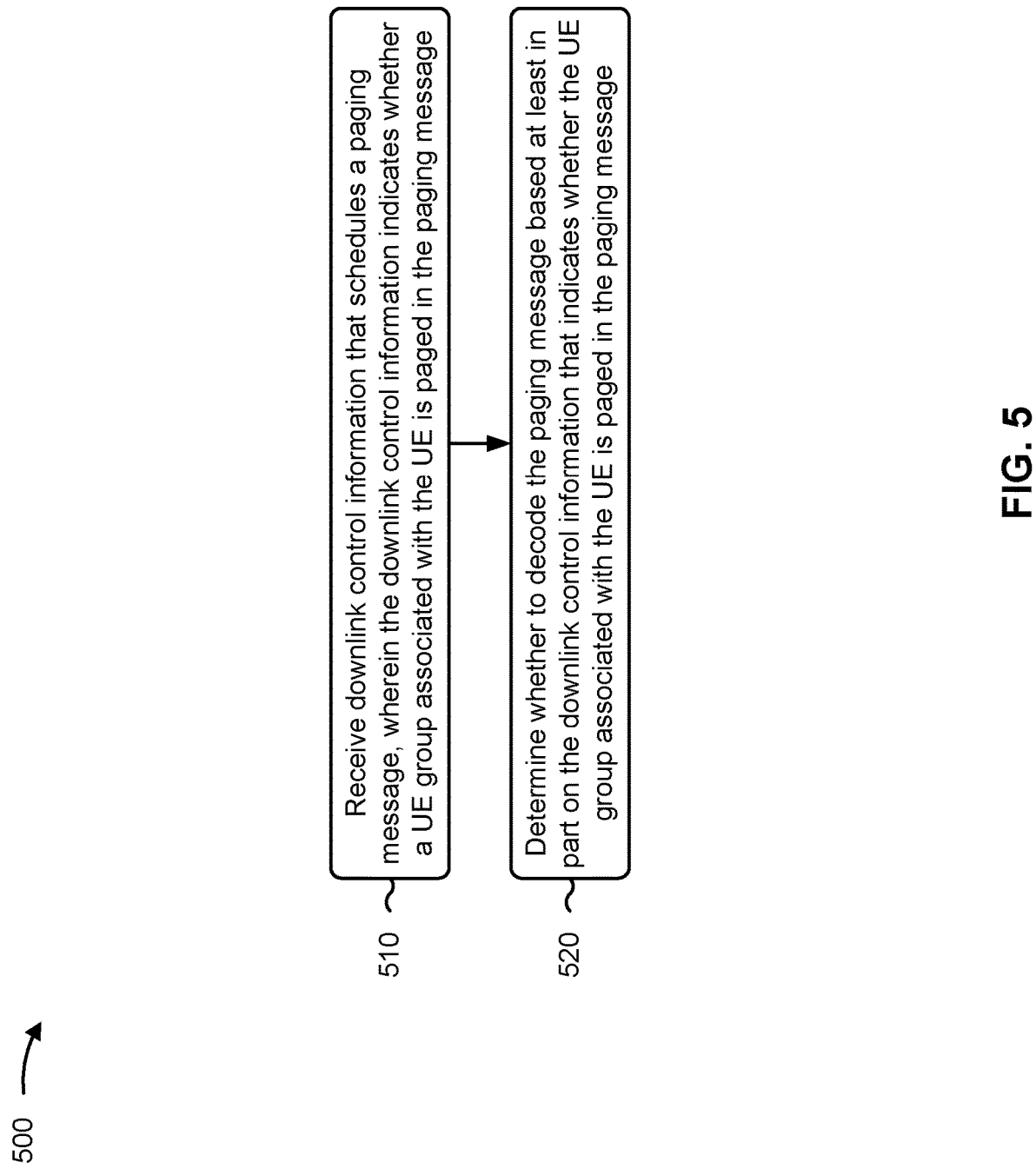
FIGS. 5-6 are diagrams illustrating example processes associated with page decoding reduction based on downlink control information, in accordance with the present disclosure.

FIG. 5 is a diagram illustrating an example process 500 performed, for example, by a UE, in accordance with the present disclosure. Example process 500 is an example where the UE (e.g., UE 120) performs operations associated with page decoding reduction based on downlink control information.

As shown in FIG. 5, in some aspects, process 500 may include receiving downlink control information that schedules a paging message, wherein the downlink control information indicates whether a UE group associated with the UE is paged in the paging message (block 510). For example, the UE (e.g., using antenna 252, demodulator 254, MIMO detector 256, receive processor 258, controller/processor 280, and/or memory 282) may receive downlink control information that schedules a paging message, wherein the downlink control information indicates whether a UE group associated with the UE is paged in the paging message, as described above.

As further shown in FIG. 5, in some aspects, process 500 may include determining whether to decode the paging message based at least in part on the downlink control information that indicates whether the UE group associated with the UE is paged in the paging message (block 520). For example, the UE (e.g., using antenna 252, demodulator 254, MIMO detector 256, receive processor 258, transmit processor 264, TX MIMO processor 266, modulator 254, controller/processor 280, and/or memory 282) may determine whether to decode the paging message based at least in part on the downlink control information that indicates whether the UE group associated with the UE is paged in the paging message, as described above.

Process 500 may include additional aspects, such as any single aspect or any combination of aspects described below and/or in connection with one or more other processes described elsewhere herein.

In a first aspect, the downlink control information is downlink control information with a cyclic redundancy check scrambled by a paging radio network temporary identifier.

In a second aspect, alone or in combination with the first aspect, the paging message is a physical downlink shared channel communication paging message.

In a third aspect, alone or in combination with one or more of the first and second aspects, the UE group associated with the UE includes the UE and one or more other UEs, and the downlink control information indicates that the UE group associated with the UE is paged in the paging message when at least one UE in the UE group associated with the UE is paged in the paging message.

In a fourth aspect, alone or in combination with one or more of the first through third aspects, the downlink control information includes a short message indicator, a short message field, and a reserved bits field, and at least one of the short message field or the reserved bits field provides one or more paging indications for one or more UE groups including the UE group associated with the UE.

In a fifth aspect, alone or in combination with one or more of the first through fourth aspects, the short message indicator is used to indicate which of the at least one of the short message field or the reserved bits field provides the one or more paging indications.

In a sixth aspect, alone or in combination with one or more of the first through fifth aspects, when the short message indicator indicates that the short message field is reserved, the short message field provides the one or more paging indications.

In a seventh aspect, alone or in combination with one or more of the first through sixth aspects, when the short message indicator indicates that the short message field is reserved, the short message field and the reserved bits field provide the one or more paging indications.

In an eighth aspect, alone or in combination with one or more of the first through seventh aspects, when the short message indicator indicates that the short message field is not reserved, the reserved bits field provides the one or more paging indications.

In a ninth aspect, alone or in combination with one or more of the first through eighth aspects, process 500 includes, prior to receiving the downlink control information, receiving a configuration that includes a mapping between one or more values for the short message indicator and which of the at least one of the short message field or the reserved bits field is to be used to provide the one or more paging indications.

In a tenth aspect, alone or in combination with one or more of the first through ninth aspects, one or more bits in the at least one of the short message field or the reserved bits field are used to provide respective paging indications for the one or more UE groups, and the respective paging indications for the one or more UE groups indicate whether the one or more UE groups are paged in the paging message.

In an eleventh aspect, alone or in combination with one or more of the first through tenth aspects, a bit of the one or more bits in the at least one of the short message field or the reserved bits field is used to indicate whether the UE group associated with the UE is paged in the paging message.

In a twelfth aspect, alone or in combination with one or more of the first through eleventh aspects, one or more bits in the at least one of the short message field or the reserved bits field are used to indicate which UE group, in the one or more UE groups, is paged in the paging message.

In a thirteenth aspect, alone or in combination with one or more of the first through twelfth aspects, different combinations of values for the one or more bits in the at least one of the short message field or the reserved bits field are used to indicate that different UE groups in the one or more UE groups are paged in the paging message.

In a fourteenth aspect, alone or in combination with one or more of the first through thirteenth aspects, a combination of values of bits in the at least one of the short message field or the reserved bits field is used to indicate a UE group that is paged, or multiple UE groups that are paged, of the one or more UE groups.

In a fifteenth aspect, alone or in combination with one or more of the first through fourteenth aspects, different combinations of values of the bits in the at least one of the short message field or the reserved bits field are mapped to different combinations of the one or more UE groups, and the different combinations of the one or more UE groups include one or multiple UE groups of the one or more UE groups.

In a sixteenth aspect, alone or in combination with one or more of the first through fifteenth aspects, the reserved bits field is used to indicate a paged UE group of the one or more UE groups.

In a seventeenth aspect, alone or in combination with one or more of the first through sixteenth aspects, the short message field is used to indicate whether one or more UE subgroups of the paged UE group are paged.

In an eighteenth aspect, alone or in combination with one or more of the first through seventeenth aspects, the paged UE group is the UE group associated with the UE, and determining whether to decode the paging message comprises determining whether to decode the paging message based at least in part on an indication, in the short message field, of whether a UE subgroup associated with the UE is paged.

In a nineteenth aspect, alone or in combination with one or more of the first through eighteenth aspects, the short message indicator includes a first bit and a second bit, and when the short message indicator indicates that the short message field is reserved, the second bit of the short message indicator and the at least one of the short message field or the reserved bits field provide the one or more paging indications.

In a twentieth aspect, alone or in combination with one or more of the first through nineteenth aspects, the short message indicator includes a first bit and a second bit, and when the short message indicator indicates that the short message field is reserved, the second bit of the short message indicator provides a first paging indication for at least one UE group of the one or more UE groups.

In a twenty-first aspect, alone or in combination with one or more of the first through twentieth aspects, the at least one of the short message field or the reserved bits field provides one or more second paging indications for UE subgroups of the at least one UE group.

In a twenty-second aspect, alone or in combination with one or more of the first through twenty-first aspects, a first one of the short message field or the reserved bits field provides one or more second paging indications for first UE subgroups of the at least one UE group, and a second one of the short message field or the reserved bits field provides one or more third paging indications for second UE subgroups of at least one of the first UE subgroups.

In a twenty-third aspect, alone or in combination with one or more of the first through twenty-second aspects, a first short message indicator value is used to indicate that the short message field is reserved and at least one paging indication for at least one UE group of the one or more UE groups is included in the at least one of the short message field or the reserved bits field, and a second short message indicator value is used to indicate that the short message field is reserved and no paging indication is included in the at least one of the short message field or the reserved bits field.

In a twenty-fourth aspect, alone or in combination with one or more of the first through twenty-third aspects, process 500 includes, prior to receiving the downlink control information, receiving a configuration that maps the UE to the UE group associated with the UE.

In a twenty-fifth aspect, alone or in combination with one or more of the first through twenty-fourth aspects, the configuration maps the UE to at least one UE sub-group of the UE group associated with the UE.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
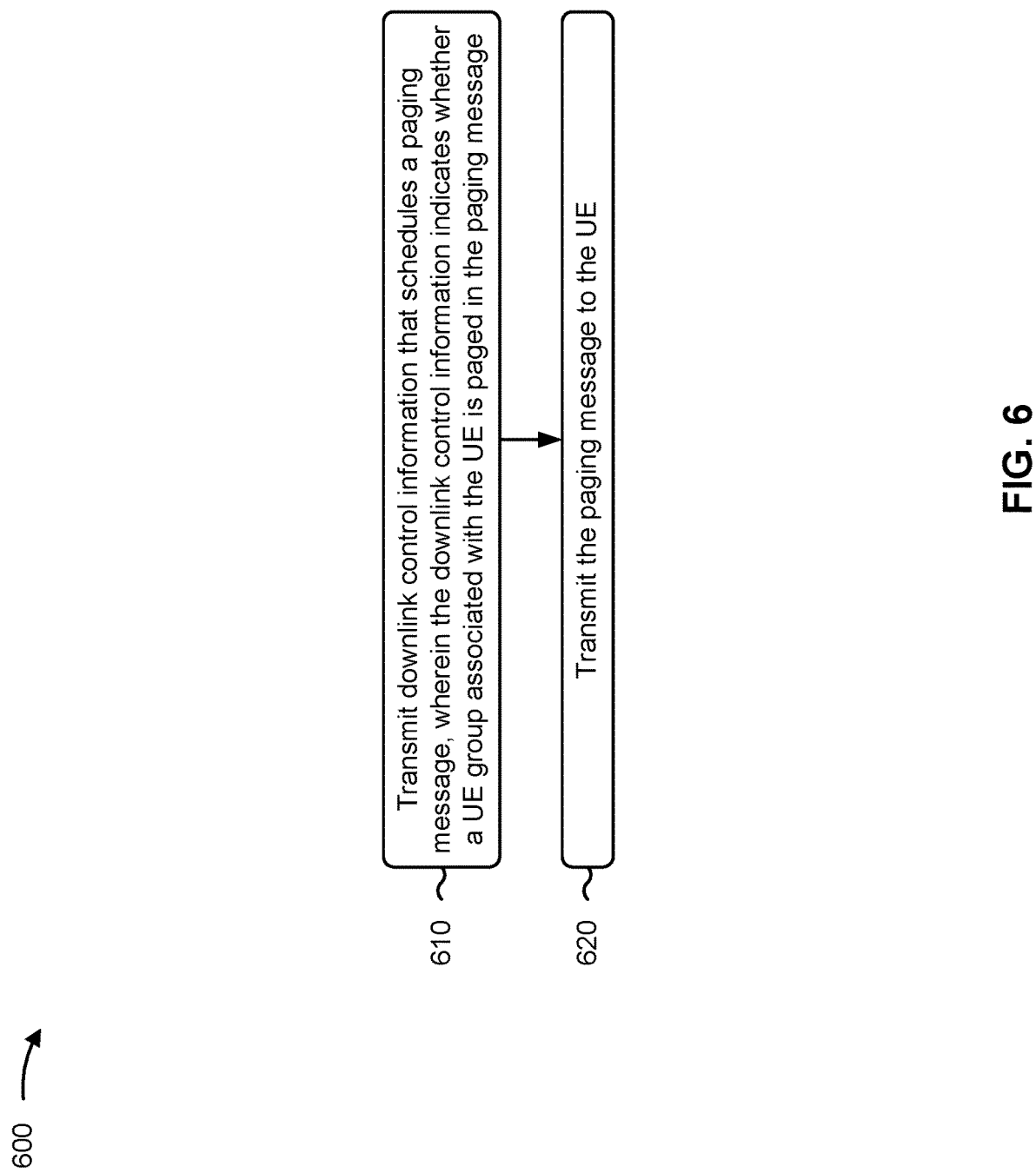

FIG. 6 is a diagram illustrating an example process 600 performed, for example, by a base station, in accordance with the present disclosure. Example process 600 is an example where the base station (e.g., base station 110) performs operations associated with page decoding reduction based on downlink control information.

As shown in FIG. 6, in some aspects, process 600 may include transmitting, to a UE, downlink control information that schedules a paging message, wherein the downlink control information indicates whether a UE group associated with the UE is paged in the paging message (block 610). For example, the base station (e.g., using transmit processor 220, TX MIMO processor 230, modulator 232, antenna 234, controller/processor 240, memory 242, and/or scheduler 246) may transmit, to a UE, downlink control information that schedules a paging message, wherein the downlink control information indicates whether a UE group associated with the UE is paged in the paging message, as described above.

As further shown in FIG. 6, in some aspects, process 600 may include transmitting the paging message to the UE (block 620). For example, the base station (e.g., using transmit processor 220, TX MIMO processor 230, modulator 232, antenna 234, controller/processor 240, memory 242, and/or scheduler 246) may transmit the paging message to the UE, as described above.

Process 600 may include additional aspects, such as any single aspect or any combination of aspects described below and/or in connection with one or more other processes described elsewhere herein.

In a first aspect, the downlink control information is downlink control information with a cyclic redundancy check scrambled by a paging radio network temporary identifier.

In a second aspect, alone or in combination with the first aspect, the paging message is a physical downlink shared channel communication paging message.

In a third aspect, alone or in combination with one or more of the first and second aspects, the UE group associated with the UE includes the UE and one or more other UEs, and the downlink control information indicates that the UE group associated with the UE is paged in the paging message when at least one UE in the UE group associated with the UE is paged in the paging message.

In a fourth aspect, alone or in combination with one or more of the first through third aspects, the downlink control information includes a short message indicator, a short message field, and a reserved bits field, and at least one of the short message field or the reserved bits field provides one or more paging indications for one or more UE groups including the UE group associated with the UE.

In a fifth aspect, alone or in combination with one or more of the first through fourth aspects, the short message indicator is used to indicate which of the at least one of the short message field or the reserved bits field provides the one or more paging indications.

In a sixth aspect, alone or in combination with one or more of the first through fifth aspects, when the short message indicator indicates that the short message field is reserved, the short message field provides the one or more paging indications.

In a seventh aspect, alone or in combination with one or more of the first through sixth aspects, when the short message indicator indicates that the short message field is reserved, the short message field and the reserved bits field provide the one or more paging indications.

In an eighth aspect, alone or in combination with one or more of the first through seventh aspects, when the short message indicator indicates that the short message field is not reserved, the reserved bits field provides the one or more paging indications.

In a ninth aspect, alone or in combination with one or more of the first through eighth aspects, process 600 includes, prior to transmitting the downlink control information, transmitting, to the UE, a configuration that includes a mapping between one or more values for the short message indicator and which of the at least one of the short message field or the reserved bits field is to be used to provide the one or more paging indications.

In a tenth aspect, alone or in combination with one or more of the first through ninth aspects, one or more bits in the at least one of the short message field or the reserved bits field are used to provide respective paging indications for the one or more UE groups, and the respective paging indications for the one or more UE groups indicate whether the one or more UE groups are paged in the paging message.

In an eleventh aspect, alone or in combination with one or more of the first through tenth aspects, a bit of the one or more bits in the at least one of the short message field or the reserved bits field is used to indicate whether the UE group associated with the UE is paged in the paging message.

In a twelfth aspect, alone or in combination with one or more of the first through eleventh aspects, one or more bits in the at least one of the short message field or the reserved bits field are used to indicate which UE group, in the one or more UE groups, is paged in the paging message.

In a thirteenth aspect, alone or in combination with one or more of the first through twelfth aspects, different combinations of values for the one or more bits in the at least one of the short message field or the reserved bits field are used to indicate that different UE groups in the one or more UE groups are paged in the paging message.

In a fourteenth aspect, alone or in combination with one or more of the first through thirteenth aspects, a combination of values of bits in the at least one of the short message field or the reserved bits field is used to indicate a UE group that is paged, or multiple UE groups that are paged, of the one or more UE groups.

In a fifteenth aspect, alone or in combination with one or more of the first through fourteenth aspects, different combinations of values of the bits in the at least one of the short message field or the reserved bits field are mapped to different combinations of the one or more UE groups, and the different combinations of the one or more UE groups include one or multiple UE groups of the one or more UE groups.

In a sixteenth aspect, alone or in combination with one or more of the first through fifteenth aspects, the reserved bits field is used to indicate a paged UE group of the one or more UE groups.

In a seventeenth aspect, alone or in combination with one or more of the first through sixteenth aspects, the short message field is used to indicate whether one or more UE subgroups of the paged UE group are paged.

In an eighteenth aspect, alone or in combination with one or more of the first through seventeenth aspects, the paged UE group is the UE group associated with the UE, and the short message field indicates whether a UE subgroup associated with the UE is paged.

In a nineteenth aspect, alone or in combination with one or more of the first through eighteenth aspects, the short message indicator includes a first bit and a second bit, and when the short message indicator indicates that the short message field is reserved, the second bit of the short message indicator and the at least one of the short message field or the reserved bits field provide the one or more paging indications.

In a twentieth aspect, alone or in combination with one or more of the first through nineteenth aspects, the short message indicator includes a first bit and a second bit, and when the short message indicator indicates that the short message field is reserved, the second bit of the short message indicator provides a first paging indication for at least one UE group of the one or more UE groups.

In a twenty-first aspect, alone or in combination with one or more of the first through twentieth aspects, the at least one of the short message field or the reserved bits field provides one or more second paging indications for UE subgroups of the at least one UE group.

In a twenty-second aspect, alone or in combination with one or more of the first through twenty-first aspects, a first one of the short message field or the reserved bits field provides one or more second paging indications for first UE subgroups of the at least one UE group, and a second one of the short message field or the reserved bits field provides one or more third paging indications for second UE subgroups of at least one of the first UE subgroups.

In a twenty-third aspect, alone or in combination with one or more of the first through twenty-second aspects, a first short message indicator value is used to indicate that the short message field is reserved and at least one paging indication for at least one UE group of the one or more UE groups is included in the at least one of the short message field or the reserved bits field, and a second short message indicator value is used to indicate that the short message field is reserved and no paging indication is included in the at least one of the short message field or the reserved bits field.

In a twenty-fourth aspect, alone or in combination with one or more of the first through twenty-third aspects, process 600 includes, prior to transmitting the downlink control information, transmitting, to the UE, a configuration that maps the UE to the UE group associated with the UE.

In a twenty-fifth aspect, alone or in combination with one or more of the first through twenty-fourth aspects, the configuration maps the UE to at least one UE sub-group of the UE group associated with the UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method of wireless communication performed by a user equipment (UE), comprising: receiving downlink control information that schedules a paging message, wherein the downlink control information indicates whether a UE group associated with the UE is paged in the paging message; and determining whether to decode the paging message based at least in part on the downlink control information that indicates whether the UE group associated with the UE is paged in the paging message.

Aspect 2: The method of Aspect 1, wherein the downlink control information is downlink control information with a cyclic redundancy check scrambled by a paging radio network temporary identifier.

Aspect 3: The method of any of Aspects 1-2, wherein the paging message is a physical downlink shared channel communication paging message.

Aspect 4: The method of any of Aspects 1-3, wherein the UE group associated with the UE includes the UE and one or more other UEs, and the downlink control information indicates that the UE group associated with the UE is paged in the paging message when at least one UE in the UE group associated with the UE is paged in the paging message.

Aspect 5: The method of any of Aspects 1-4, wherein the downlink control information includes a short message indicator, a short message field, and a reserved bits field, and at least one of the short message field or the reserved bits field provides one or more paging indications for one or more UE groups including the UE group associated with the UE.

Aspect 6: The method of Aspect 5, wherein the short message indicator is used to indicate which of the at least one of the short message field or the reserved bits field provides the one or more paging indications.

Aspect 7: The method of Aspect 6, wherein when the short message indicator indicates that the short message field is reserved, the short message field provides the one or more paging indications.

Aspect 8: The method of Aspect 6, wherein when the short message indicator indicates that the short message field is reserved, the short message field and the reserved bits field provide the one or more paging indications.

Aspect 9: The method of Aspect 6, wherein when the short message indicator indicates that the short message field is not reserved, the reserved bits field provides the one or more paging indications.

Aspect 10: The method of any of Aspects 6-9, further comprising: prior to receiving the downlink control information, receiving a configuration that includes a mapping between one or more values for the short message indicator and which of the at least one of the short message field or the reserved bits field is to be used to provide the one or more paging indications.

Aspect 11: The method of any of Aspects 5-10, wherein one or more bits in the at least one of the short message field or the reserved bits field are used to provide respective paging indications for the one or more UE groups, and wherein the respective paging indications for the one or more UE groups indicate whether the one or more UE groups are paged in the paging message.

Aspect 12: The method of Aspect 11, wherein a bit of the one or more bits in the at least one of the short message field or the reserved bits field is used to indicate whether the UE group associated with the UE is paged in the paging message.

Aspect 13: The method of any of Aspects 5-10, wherein one or more bits in the at least one of the short message field or the reserved bits field are used to indicate which UE group, in the one or more UE groups, is paged in the paging message.

Aspect 14: The method of Aspect 13, wherein different combinations of values for the one or more bits in the at least one of the short message field or the reserved bits field are used to indicate that different UE groups in the one or more UE groups are paged in the paging message.

Aspect 15: The method of any of Aspects 5-10, wherein a combination of values of bits in the at least one of the short message field or the reserved bits field is used to indicate a UE group that is paged, or multiple UE groups that are paged, of the one or more UE groups.

Aspect 16: The method of Aspect 15, wherein different combinations of values of the bits in the at least one of the short message field or the reserved bits field are mapped to different combinations of the one or more UE groups, and wherein the different combinations of the one or more UE groups include one or multiple UE groups of the one or more UE groups.

Aspect 17: The method of any of Aspects 5-16, wherein the reserved bits field is used to indicate a paged UE group of the one or more UE groups.

Aspect 18: The method of Aspect 17, wherein the short message field is used to indicate whether one or more UE subgroups of the paged UE group are paged.

Aspect 19: The method of Aspect 18, wherein the paged UE group is the UE group associated with the UE, and wherein determining whether to decode the paging message comprises: determining whether to decode the paging message based at least in part on an indication, in the short message field, of whether a UE subgroup associated with the UE is paged.

Aspect 20: The method of any of Aspects 5-19, wherein the short message indicator includes a first bit and a second bit, and when the short message indicator indicates that the short message field is reserved, the second bit of the short message indicator and the at least one of the short message field or the reserved bits field provide the one or more paging indications.

Aspect 21: The method of any of Aspects 5-20, wherein the short message indicator includes a first bit and a second bit, and when the short message indicator indicates that the short message field is reserved, the second bit of the short message indicator provides a first paging indication for at least one UE group of the one or more UE groups.

Aspect 22: The method of Aspect 21, wherein the at least one of the short message field or the reserved bits field provides one or more second paging indications for UE subgroups of the at least one UE group.

Aspect 23: The method of Aspect 21, wherein a first one of the short message field or the reserved bits field provides one or more second paging indications for first UE subgroups of the at least one UE group, and a second one of the short message field or the reserved bits field provides one or more third paging indications for second UE subgroups of at least one of the first UE subgroups.

Aspect 24: The method of any of Aspects 5-19, wherein a first short message indicator value is used to indicate that the short message field is reserved and at least one paging indication for at least one UE group of the one or more UE groups is included in the at least one of the short message field or the reserved bits field, and a second short message indicator value is used to indicate that the short message field is reserved and no paging indication is included in the at least one of the short message field or the reserved bits field.

Aspect 25: The method of any of Aspects 1-24, further comprising: prior to receiving the downlink control information, receiving a configuration that maps the UE to the UE group associated with the UE.

Aspect 26: The method of Aspect 25, wherein the configuration maps the UE to at least one UE sub-group of the UE group associated with the UE.

Aspect 27: A method of wireless communication performed by a base station, comprising: transmitting, to a user equipment (UE), downlink control information that schedules a paging message, wherein the downlink control information indicates whether a UE group associated with the UE is paged in the paging message; and transmitting the paging message to the UE.

Aspect 28: The method of Aspect 27, wherein the downlink control information is downlink control information with a cyclic redundancy check scrambled by a paging radio network temporary identifier.

Aspect 29: The method of any of Aspects 27-28, wherein the paging message is a physical downlink shared channel communication paging message.

Aspect 30: The method of any of Aspects 27-29, wherein the UE group associated with the UE includes the UE and one or more other UEs, and the downlink control information indicates that the UE group associated with the UE is paged in the paging message when at least one UE in the UE group associated with the UE is paged in the paging message.

Aspect 31: The method of any of Aspects 27-30, wherein the downlink control information includes a short message indicator, a short message field, and a reserved bits field, and at least one of the short message field or the reserved bits field provides one or more paging indications for one or more UE groups including the UE group associated with the UE.

Aspect 32: The method of Aspect 31, wherein the short message indicator is used to indicate which of the at least one of the short message field or the reserved bits field provides the one or more paging indications.

Aspect 33: The method of Aspect 32, wherein when the short message indicator indicates that the short message field is reserved, the short message field provides the one or more paging indications.

Aspect 34: The method of Aspect 32, wherein when the short message indicator indicates that the short message field is reserved, the short message field and the reserved bits field provide the one or more paging indications.

Aspect 35: The method of Aspect 32, wherein when the short message indicator indicates that the short message field is not reserved, the reserved bits field provides the one or more paging indications.

Aspect 36: The method of any of Aspects 32-35, further comprising: prior to transmitting the downlink control information, transmitting, to the UE, a configuration that includes a mapping between one or more values for the short message indicator and which of the at least one of the short message field or the reserved bits field is to be used to provide the one or more paging indications.

Aspect 37: The method of any of Aspects 31-36, wherein one or more bits in the at least one of the short message field or the reserved bits field are used to provide respective paging indications for the one or more UE groups, and wherein the respective paging indications for the one or more UE groups indicate whether the one or more UE groups are paged in the paging message.

Aspect 38: The method of Aspect 37, wherein a bit of the one or more bits in the at least one of the short message field or the reserved bits field is used to indicate whether the UE group associated with the UE is paged in the paging message.

Aspect 39: The method of any of Aspects 31-36, wherein one or more bits in the at least one of the short message field or the reserved bits field are used to indicate which UE group, in the one or more UE groups, is paged in the paging message.

Aspect 40: The method of Aspect 39, wherein different combinations of values for the one or more bits in the at least one of the short message field or the reserved bits field are used to indicate that different UE groups in the one or more UE groups are paged in the paging message.

Aspect 41: The method of any of Aspects 31-36, wherein a combination of values of bits in the at least one of the short message field or the reserved bits field is used to indicate a UE group that is paged, or multiple UE groups that are paged, of the one or more UE groups.

Aspect 42: The method of Aspect 41, wherein different combinations of values of the bits in the at least one of the short message field or the reserved bits field are mapped to different combinations of the one or more UE groups, and wherein the different combinations of the one or more UE groups include one or multiple UE groups of the one or more UE groups.

Aspect 43: The method of any of Aspects 31-42, wherein the reserved bits field is used to indicate a paged UE group of the one or more UE groups.

Aspect 44: The method of Aspect 43, wherein the short message field is used to indicate whether one or more UE subgroups of the paged UE group are paged.

Aspect 45: The method of Aspect 44, wherein the paged UE group is the UE group associated with the UE, and the short message field indicates whether a UE subgroup associated with the UE is paged.

Aspect 46: The method of any of Aspects 31-45, wherein the short message indicator includes a first bit and a second bit, and when the short message indicator indicates that the short message field is reserved, the second bit of the short message indicator and the at least one of the short message field or the reserved bits field provide the one or more paging indications.

Aspect 47: The method of any of Aspects 31-46, wherein the short message indicator includes a first bit and a second bit, and when the short message indicator indicates that the short message field is reserved, the second bit of the short message indicator provides a first paging indication for at least one UE group of the one or more UE groups.

Aspect 48: The method of Aspect 47, wherein the at least one of the short message field or the reserved bits field provides one or more second paging indications for UE subgroups of the at least one UE group.

Aspect 49: The method of Aspect 47, wherein a first one of the short message field or the reserved bits field provides one or more second paging indications for first UE subgroups of the at least one UE group, and a second one of the short message field or the reserved bits field provides one or more third paging indications for second UE subgroups of at least one of the first UE subgroups.

Aspect 50: The method of any of Aspects 31-45, wherein a first short message indicator value is used to indicate that the short message field is reserved and at least one paging indication for at least one UE group of the one or more UE groups is included in the at least one of the short message field or the reserved bits field, and a second short message indicator value is used to indicate that the short message field is reserved and no paging indication is included in the at least one of the short message field or the reserved bits field.

Aspect 51: The method of any of Aspects 27-50, further comprising: prior to transmitting the downlink control information, transmitting, to the UE, a configuration that maps the UE to the UE group associated with the UE.

Aspect 52: The method of Aspect 51, wherein the configuration maps the UE to at least one UE sub-group of the UE group associated with the UE.

Aspect 53: An apparatus for wireless communication at a device, comprising a processor; memory coupled with the processor; and instructions stored in the memory and executable by the processor to cause the apparatus to perform the method of one or more of Aspects 1-26.

Aspect 54: An apparatus for wireless communication at a device, comprising a processor; memory coupled with the processor; and instructions stored in the memory and executable by the processor to cause the apparatus to perform the method of one or more of Aspects 27-52.

Aspect 55: A device for wireless communication, comprising a memory and one or more processors coupled to the memory, the one or more processors configured to perform the method of one or more of Aspects 1-26.

Aspect 56: A device for wireless communication, comprising a memory and one or more processors coupled to the memory, the one or more processors configured to perform the method of one or more of Aspects 27-52.

Aspect 57: An apparatus for wireless communication, comprising at least one means for performing the method of one or more of Aspects 1-26.

Aspect 58: An apparatus for wireless communication, comprising at least one means for performing the method of one or more of Aspects 27-52.

Aspect 59: A non-transitory computer-readable medium storing code for wireless communication, the code comprising instructions executable by a processor to perform the method of one or more of Aspects 1-26.

Aspect 60: A non-transitory computer-readable medium storing code for wireless communication, the code comprising instructions executable by a processor to perform the method of one or more of Aspects 27-52.

Aspect 61: A non-transitory computer-readable medium storing a set of instructions for wireless communication, the set of instructions comprising one or more instructions that, when executed by one or more processors of a device, cause the device to perform the method of one or more of Aspects 1-26.

Aspect 62: A non-transitory computer-readable medium storing a set of instructions for wireless communication, the set of instructions comprising one or more instructions that, when executed by one or more processors of a device, cause the device to perform the method of one or more of Aspects 27-52.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication, comprising:
one or more memories comprising instructions; and
one or more processors configured to execute the instructions and cause the apparatus to:
receive downlink control information (DCI) that schedules a paging message, said DCI comprising a short message indicator, a short message field, and a reserved bits field, wherein at least one of the short message field or the reserved bits field indicates whether a user equipment (UE) group associated with the apparatus is to be paged in the paging message, wherein the short message indicator indicates which of the at least one of the short message field or the reserved bits field indicates whether the UE group associated with the apparatus is to be paged in the paging message; and
selectively decode the paging message based at least in part on the DCI.

2. The apparatus of claim 1, wherein at least one of the short message field or the reserved bits field provides one or more paging indications for one or more UE groups including the UE group associated with the apparatus.

3. The apparatus of claim 2, wherein in the one or more processors are further configured to:
receive a configuration that includes a mapping between one or more values for the short message indicator and which of the at least one of the short message field or the reserved bits field is to be used to provide the one or more paging indications.

4. The apparatus of claim 2, wherein a bit of the one or more bits in the at least one of the short message field or the reserved bits field is used to indicate whether a UE group, of one or more UE groups, associated with the apparatus is to be paged in the paging message.

5. The apparatus of claim 2, wherein one or more bits in the at least one of the short message field or the reserved bits field are used to indicate which UE group, in the one or more UE groups, is to be paged in the paging message, and wherein different combinations of values for the one or more bits in the at least one of the short message field or the reserved bits field are used to indicate that different UE groups in the one or more UE groups are to be paged in the paging message.

6. The apparatus of claim 2, wherein a combination of values of bits in the at least one of the short message field or the reserved bits field is used to indicate a UE group that is to be paged, or multiple UE groups that are to be paged, of the one or more UE groups, wherein different combinations of values of the bits in the at least one of the short message field or the reserved bits field are mapped to different combinations of the one or more UE groups, and wherein the different combinations of the one or more UE groups include one or multiple UE groups of the one or more UE groups.

7. The apparatus of claim 2, wherein the reserved bits field is used to indicate a paged UE group of the one or more UE groups, wherein the short message field is used to indicate whether one or more UE subgroups of the paged UE group are to be paged.

8. The apparatus of claim 7, wherein the paged UE group is the UE group associated with the apparatus, and wherein selectively decoding the paging message comprises:
   selectively decoding the paging message based on an indication, in the short message field, of whether a UE subgroup associated with the apparatus is to be paged.

9. The apparatus of claim 2, wherein the short message indicator includes a first bit and a second bit, and when the short message indicator indicates that the short message field is reserved, the second bit of the short message indicator and the at least one of the short message field or the reserved bits field provide the one or more paging indications.

10. The apparatus of claim 2, wherein the short message indicator includes a first bit and a second bit, and when the short message indicator indicates that the short message field is reserved, the second bit of the short message indicator provides a first paging indication for at least one UE group of the one or more UE groups and the at least one of the short message field or the reserved bits field provides one or more second paging indications for UE subgroups of the at least one UE group.

11. The apparatus of claim 10, wherein a first one of the short message field or the reserved bits field provides the one or more second paging indications for first UE subgroups of the at least one UE group, and a second one of the short message field or the reserved bits field provides one or more third paging indications for second UE subgroups of at least one of the first UE subgroups.

12. The apparatus of claim 2, wherein a first short message indicator value is used to indicate that the short message field is reserved and at least one paging indication for at least one UE group of the one or more UE groups is included in the at least one of the short message field or the reserved bits field, and a second short message indicator value is used to indicate that the short message field is reserved and no paging indication is included in the at least one of the short message field or the reserved bits field.

13. The apparatus of claim 1, wherein the one or more processors are further configured to:
   receive a configuration that maps the apparatus to the UE group associated with the apparatus and maps the apparatus to at least one UE sub-group of the UE group associated with the apparatus.

14. The apparatus of claim 1, wherein the one or more processors, to selectively decode the paging message, are further configured to:
   decode the paging message based at least in part on the DCI comprising a cyclic redundancy check scrambled by a paging radio network temporary identifier (P-RNTI).

15. The apparatus of claim 1, further comprising a transceiver configured to receive the DCI, wherein the apparatus is configured as a UE.

16. A base station for wireless communication, comprising:
   a transceiver;
   one or more memories comprising instructions; and
   one or more processors configured to execute the instructions and cause the base station to:
      transmit, via the transceiver, to a user equipment (UE), downlink control information (DCI) that schedules a paging message, said DCI comprising a short message indicator, a short message field, and a reserved bits field, wherein at least one of the short message field or the reserved bits field indicates whether a UE group associated with the UE is to be paged in the paging message, wherein the short message indicator indicates which of the at least one of the short message field or the reserved bits field indicates whether the UE group associated with the UE is to be paged in the paging message; and
      transmit, via the transceiver, the paging message to the UE.

17. The base station of claim 16, wherein at least one of the short message field or the reserved bits field provides one or more paging indications for one or more UE groups including the UE group associated with the UE.

18. The base station of claim 17, wherein the one or more processors are further configured to:
   transmit, to the UE, via the transceiver, a configuration that includes a mapping between one or more values for the short message indicator and which of the at least one of the short message field or the reserved bits field is to be used to provide the one or more paging indications.

19. The base station of claim 17, wherein the reserved bits field is used to indicate a paged UE group of the one or more UE groups, and wherein the short message field is used to indicate whether one or more UE subgroups of the paged UE group are to be paged.

20. The base station of claim 16, wherein transmitting the DCI further comprises:
   transmitting the DCI with a cyclic redundancy check (CRC) scrambled by a paging radio network temporary identifier (P-RNTI).

21. A method for wireless communication at a user equipment (UE), comprising:
   receiving downlink control information (DCI) that schedules a paging message, said DCI comprising a short message indicator, a short message field, and a reserved bits field, wherein at least one of the short message field or the reserved bits field indicates whether a UE group associated with the UE is to be paged in the paging message, wherein the short message indicator indicates which of the at least one of the short message field or the reserved bits field indicates whether the UE group associated with the UE is to be paged in the paging message; and
   selectively decoding the paging message based at least in part on the DCI.

22. The method of claim 21, wherein at least one of the short message field or the reserved bits field provides one or more paging indications for one or more UE groups including the UE group associated with the UE.

23. The method of claim 22, wherein a bit of the one or more bits in the at least one of the short message field or the reserved bits field is used to indicate whether a UE group, of one or more UE groups, associated with the UE is to be paged in the paging message.

24. The method of claim 22, wherein one or more bits in the at least one of the short message field or the reserved bits field are used to indicate which UE group, in the one or more UE groups, is to be paged in the paging message, and wherein different combinations of values for the one or more bits in the at least one of the short message field or the reserved bits field are used to indicate that different UE groups in the one or more UE groups are to be paged in the paging message.

25. The method of claim 22, wherein a combination of values of bits in the at least one of the short message field or the reserved bits field is used to indicate a UE group that is to be paged, or multiple UE groups that are to be paged, of the one or more UE groups, wherein different combinations of values of the bits in the at least one of the short message field or the reserved bits field are mapped to different combinations of the one or more UE groups, and wherein the different combinations of the one or more UE groups include one or multiple UE groups of the one or more UE groups.

26. The method of claim 22, wherein the reserved bits field is used to indicate a paged UE group of the one or more UE groups, wherein the short message field is used to indicate whether one or more UE subgroups of the paged UE group are to be paged.

27. The method of claim 22, wherein the short message indicator includes a first bit and a second bit, and when the short message indicator indicates that the short message field is reserved, the second bit of the short message indicator and the at least one of the short message field or the reserved bits field provide the one or more paging indications.

28. The method of claim 22, wherein a first short message indicator value is used to indicate that the short message field is reserved and at least one paging indication for at least one UE group of the one or more UE groups is included in the at least one of the short message field or the reserved bits field, and a second short message indicator value is used to indicate that the short message field is reserved and no paging indication is included in the at least one of the short message field or the reserved bits field.

29. The method of claim 21, further comprising:
prior to receiving the DCI, receiving a configuration that maps the UE to the UE group associated with the UE and maps the UE to at least one UE sub-group of the UE group associated with the UE.

30. A method flofil for wireless communication at a base station, comprising:
transmitting, to a user equipment (UE), downlink control information (DCI) that schedules a paging message, said DCI comprising a short message indicator, a short message field, and a reserved bits field, wherein at least one of the short message field or the reserved bits field indicates whether a UE group associated with the UE is to be paged in the paging message, wherein the short message indicator indicates which of the at least one of the short message field or the reserved bits field indicates whether the UE group associated with the UE is to be paged in the paging message; and
transmitting the paging message to the UE.

* * * * *